United States Patent
Li et al.

(10) Patent No.: US 11,936,455 B2
(45) Date of Patent: Mar. 19, 2024

(54) CHANNEL STATE INFORMATION FEEDBACK METHOD AND DEVICE

(71) Applicant: DATANG MOBILE COMMUNICATIONS EQUIPMENT CO., LTD., Beijing (CN)

(72) Inventors: Hui Li, Beijing (CN); Qiubin Gao, Beijing (CN); Zhengxuan Liu, Beijing (CN); Runhua Chen, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 353 days.

(21) Appl. No.: 17/598,834

(22) PCT Filed: Feb. 26, 2020

(86) PCT No.: PCT/CN2020/076840
§ 371 (c)(1),
(2) Date: Sep. 27, 2021

(87) PCT Pub. No.: WO2020/192346
PCT Pub. Date: Oct. 1, 2020

(65) Prior Publication Data
US 2022/0182121 A1    Jun. 9, 2022

(30) Foreign Application Priority Data

Mar. 27, 2019   (CN) .......................... 201910239518.3

(51) Int. Cl.
*H04B 7/06* (2006.01)
*H04B 7/0456* (2017.01)

(52) U.S. Cl.
CPC ......... *H04B 7/0626* (2013.01); *H04B 7/0469* (2013.01)

(58) Field of Classification Search
CPC ........................... H04B 7/0626; H04B 7/0649
See application file for complete search history.

(56) References Cited

U.S. PATENT DOCUMENTS

2015/0288499 A1* 10/2015 Nam .................... H04B 7/0647
370/329

FOREIGN PATENT DOCUMENTS

| CN | 106797241 A | 5/2017 |
| CN | 107370530 A | 11/2017 |

(Continued)

OTHER PUBLICATIONS

Huawei et al., "Design for Type II Feedback",3GPP TSG RAN WG1 NR Ad Hoc Meeting, Spokane, USA, Jan. 16-20, 2017, total 8 pages, R1-1700415.

(Continued)

*Primary Examiner* — Duc C Ho
(74) *Attorney, Agent, or Firm* — Kilpatrick Townsend & Stockton LLP

(57) ABSTRACT

A channel state information (CSI) feedback method and device are disclosed. In the method, a terminal determines an orthogonal beam group and pre-coding matrix information according to codebook parameter information, where a same beam in the orthogonal beam group has same specified coefficients in first and second polarization directions, each of the specified coefficients comprises an amplitude coefficient and/or a phase coefficient; the pre-coding matrix information includes the specified coefficients and adjustment factors, and the adjustment factors are used together with the specified coefficients to determine linear combination coefficients except the specified coefficients in a linear combination coefficient set; and the pre-coding matrix information is sent to a network-side device.

20 Claims, 3 Drawing Sheets

(56) References Cited

FOREIGN PATENT DOCUMENTS

| CN | 108288983 A   | 7/2018 |
|----|---------------|--------|
| CN | 108462519 A   | 8/2018 |
| WO | 2019019839 A1 | 1/2019 |

OTHER PUBLICATIONS

Ericsson, "Encoding and mapping of CSI parameters", 3GPP TSG-RAN WG1 #90, Prague, Czech Republic, Aug. 21-25, 2017, total 5 pages, R1-1714285.

Qualcomm Incorporated, "Discussion on advanced CSI reporting and initial evaluation results", 3GPP TSG-RAN WG1 #86, Aug. 22-26, 2016, Gothenburg, Sweden, total 6 pages, R1-166274.

\* cited by examiner

401 — A terminal determines an orthogonal beam group and precoding matrix information according to codebook parameter information; where a same beam in the orthogonal beam group has same specified coefficients in first and second polarization directions, each of the specified coefficients includes an amplitude coefficient and/or a phase coefficient, the precoding matrix information includes the specified coefficients and adjustment factors, the adjustment factors are used together with the specified coefficients to determine linear combination coefficients except the specified coefficients in a linear combination coefficient set; where the specified coefficients are a part of coefficients in the linear combination coefficient set 402 — Sending the precoding matrix information to a network-side device

Fig. 4

501 — A network-side device sends codebook parameter information to a terminal

502 — Receiving precoding matrix information sent by the terminal, where the precoding matrix information includes specified coefficients and adjustment factors, where a same beam in an orthogonal beam group has same specified coefficients in first and second polarization directions, each of the specified coefficients includes an amplitude coefficient and/or a phase coefficient, and the specified coefficients are a part of coefficients in a linear combination coefficient set 503 — Determining linear combination coefficients except the specified coefficients in the linear combination coefficient set jointly according to the adjustment factors and the specified coefficients, to obtain the linear combination coefficient set 504 — Precoding a communication signal according to the linear combination coefficient set

Fig. 5

CHANNEL STATE INFORMATION FEEDBACK METHOD AND DEVICE

CROSS-REFERENCE OF RELATED APPLICATIONS

This application is a US National Stage of International Application No. PCT/CN2020/076840, filed Feb. 26, 2020, which claims priority to Chinese Patent Application No. 201910239518.3, filed with the Chinese Patent Office on Mar. 27, 2019 and entitled "Channel State Information Feedback Method and Device", which is hereby incorporated by reference in its entirety.

FIELD

The present application relates to the field of wireless communication technologies, and particularly to a channel state information feedback method and device.

BACKGROUND

In the NR Rel-15 system, the Type II codebook is defined, which supports the layer 1 codebook and layer 2 codebook based on the linear combination of beams in an orthogonal beam group.

For a sub-band, the layer 1 codebook is expressed as:

$$W = \begin{bmatrix} \tilde{W}_{0,0} \\ \tilde{W}_{1,0} \end{bmatrix} \quad [1]$$

For a sub-band, the layer 2 codebook is expressed as:

$$W = \begin{bmatrix} \tilde{W}_{0,0} & \tilde{W}_{0,1} \\ \tilde{W}_{1,0} & \tilde{W}_{1,1} \end{bmatrix} \quad [2]$$

Here, $\tilde{W}_{r,l} = \Sigma_{i=0}^{L-1} b_{k_1^{(i)} k_2^{(i)}} \cdot p_{r,l,i}^{(WB)} \cdot p_{r,l,i}^{(SB)} \cdot c_{r,l,i}$, L represents the quantity of orthogonal beams in a group, $b_{k_1,k_2}$ represents orthogonal beams and uses a 2D DFT (2-Dimensional Discrete Fourier Transform) vector; r=0, 1 represent the first and second polarization directions in a dual-polarized antenna array, and l=0, 1 represent layers. $p_{r,l,i}^{(WB)}$ represents the broadband amplitude coefficient acting on beam i in the beam group, in the polarization direction r and layer l; $p_{r,l,i}^{(SB)}$ represents the sub-band amplitude coefficient acting on the beam i in the beam group, in the polarization direction r and layer l; $c_{r,l,i}$ represents the sub-band phase coefficient acting on the beam i in the beam group, in the polarization direction r and layer l.

Since the feedback of each sub-band includes both the sub-band phase coefficient and the sub-band amplitude coefficient, the feedback overhead required to feed back the coefficients of all the sub-bands is huge when the quantity of sub-bands is large.

The low-overhead Type II codebook is defined in the NR Rel-16 system, which compresses the coefficient of each sub-band and feeds back the compressed coefficient to the base station. Taking Rank=1 as an example, for all sub-bands, the codebook may be expressed as:

$$W = W_1 \tilde{W}_2 W_f^H = \begin{bmatrix} B_0 & B_1 & \cdots & B_{L-1} & & & & 0 \\ & & 0 & & B_0 & B_1 & \cdots & B_{L-1} \end{bmatrix}.$$

$$\begin{bmatrix} p_{diff}(0,0)q(0,0) & p_{diff}(0,1)q(0,1) & \cdots & p_{diff}(0,M-1)q(0,M-1) \\ \vdots & & & \\ p_{diff}(L-1,0)q(L-1,0) & p_{diff}(L-1,1)q(L-1,1) & \cdots & p_{diff}(L-1,M-1)q(L-1,M-1) \\ p_{ref}p_{diff}(L,0)q(L,0) & p_{ref}p_{diff}(L,1)q(L,1) & \cdots & p_{ref}p_{diff}(L,M-1)q(L,M-1) \\ \vdots & & & \\ p_{ref}p_{diff}(2L-1,0)q(2L-1,0) & p_{ref}p_{diff}(2L-1,1)q(2L-1,1) & \cdots & p_{ref}p_{diff}(2L-1,M-1)q(2L-1,M-1) \end{bmatrix}$$

$$\begin{bmatrix} c_{0,0} & c_{0,1} & \cdots & c_{0,N_3-1} \\ c_{1,0} & c_{1,1} & \cdots & c_{1,N_3-1} \\ \vdots & & & \vdots \\ c_{M-1,0} & c_{M-1,1} & \cdots & c_{M-1,N_3-1} \end{bmatrix}$$

[3]

Here, $W_1$ represents an orthogonal beam group which contains the same orthogonal combined beams as the Type II codebook of Rel-15; $\tilde{W}_2$ represents a linear combination coefficient set, here $p_{diff}(i,j)$ represents the differential amplitude coefficient, $q(i,j)$ represents the phase coefficient, and $p_{ref}$ represents the reference amplitude coefficient. In the linear combination coefficient set, the first L rows represent the first polarization direction, and the last L rows represent the second polarization direction. When the CSI (Channel State Information) is fed back, the linear combination coefficient set needs to be fed back to the base station; $W_f$ represents a compressed basis vector group, which contains M basis vectors, and the length of each vector is $N_3$, which is determined by the quantity of sub-bands configured by the system.

All coefficients in the linear combination coefficient set in $\tilde{W}_2$ need to be reported to the network-side device, so the CSI feedback overhead needs to be optimized.

SUMMARY

Embodiments of the present application provide a channel state information feedback method and device, to reduce the feedback overhead of the channel state information.

In a first aspect, a channel state information feedback method is provided, the method including: determining, by a terminal, an orthogonal beam group and precoding matrix information according to codebook parameter information; where a same beam in the orthogonal beam group has same specified coefficients in first and second polarization directions, each of the specified coefficients includes an amplitude coefficient and/or a phase coefficient, the precoding matrix information includes the specified coefficients and adjustment factors, the adjustment factors are used together with the specified coefficients to determine linear combination coefficients except the specified coefficients in a linear combination coefficient set; where the specified coefficients are a part of coefficients in the linear combination coefficient set; sending the precoding matrix information to a network-side device.

In the above method, the terminal reports the specified coefficients in the linear combination coefficient set (that is, partial linear combination coefficients) rather than the entire linear combination coefficient set. Since the quantity of reported coefficients is reduced, the system overhead caused by the feedback of CSI information may be reduced.

In a possible embodiment, each beam in the orthogonal beam group corresponds to an adjustment factor.

In the above method, when each beam in the orthogonal beam group corresponds to one adjustment factor, the adjustment factors of different beams are determined independently. If the channel conditions experienced by different beams are different, this embodiment may match the communication characteristics of the channels more flexibly.

In a possible embodiment, adjustment factors of different beams in the orthogonal beam group are determined independently, or some beams in the orthogonal beam group use a same adjustment factor.

In the above method, the adjustment factors of different beams may be the same; and when the CSI information is fed back, the quantity of adjustment factors may be reduced, to lower the feedback overhead.

In a possible embodiment, each of the specified coefficients is a linear combination coefficient in the first polarization direction, and a corresponding adjustment factor is used to determine a linear combination coefficient in the second polarization direction according to the linear combination coefficient in the first polarization direction.

In the above method, for the same beam, the linear combination coefficient in the first polarization direction differs from the linear combination coefficient in the second polarization direction by only one adjustment factor, so that the read and write operations may also be carried out orderly when generating the linear combination coefficient set in the precoding matrix information.

In a possible embodiment, adjustment factors of different layers satisfy a relationship, and the adjustment factors make the different layers have orthogonality.

In the above method, if the adjustment factors of different layers still have an association relationship, the different layers may satisfy the orthogonality to ensure the communication performance of the system. In addition, the adjustment factor only needs to be reported once, and the feedback overhead may be reduced with the increase in the quantity of layers.

In a possible embodiment, the relationship is configured by the network-side device or predefined by a system.

In a possible embodiment, the relationship is an opposite relationship in terms of values.

In the above method, this relationship may realize the orthogonality among different layers in a simple manner.

In a possible embodiment, the method includes: determining basis vector group information of each layer according to the codebook parameter information, and sending the basis vector group information of each layer to the network-side device.

In a possible embodiment, each of the adjustment factors includes at least one of: an amplitude adjustment item or a phase adjustment item; where the amplitude adjustment item is used to adjust the amplitude coefficient, and the phase adjustment item is used to adjust the phase coefficient.

In the above method, the adjustment of the linear combination coefficients may be implemented as the separate adjustment of the amplitude coefficient, the separate adjustment of the phase coefficient, or the simultaneous adjustment of the amplitude coefficient and the phase coefficient. It may be seen that the adjustment method of the adjustment factors may be flexibly configured due to different adjustment objects and may cope with different scene requirements.

In a possible embodiment, adjustment factors of beams of which communication channel correlation is higher than a first value in the orthogonal beam group are identical; and/or adjustment factors of beams of which communication channel correlation is lower than a second value in the orthogonal beam group are different, where the first value is higher than the second value.

In the above method, the adjustment factors of different beams may be identical; and when the CSI information is fed back, the quantity of adjustment factors may be reduced, to lower the feedback overhead.

In a possible embodiment, the specified coefficients are non-zero coefficients.

In a second aspect, an embodiment of the present application provides a channel state information feedback method on the network-side device side, the method including: sending, by a network-side device, codebook parameter information to a terminal; receiving precoding matrix information sent by the terminal, where the precoding matrix information includes specified coefficients and adjustment factors, where a same beam in an orthogonal beam group has same specified coefficients in first and second polarization directions, each of the specified coefficients includes an amplitude coefficient and/or a phase coefficient, and the specified coefficients are a part of coefficients in a linear combination coefficient set; determining linear combination coefficients except the specified coefficients in the linear combination coefficient set jointly according to the adjustment factors and the specified coefficients, to obtain the linear combination coefficient set; precoding a communication signal according to the linear combination coefficient set.

In the above method, the terminal reports the specified coefficients in the linear combination coefficient set (that is, partial linear combination coefficients) rather than the entire linear combination coefficient set. In addition, the terminal reports the adjustment factors so that the network-side device may restore all required linear combination coefficients according to the adjustment factors. Since the quantity of reported coefficients is reduced, the system overhead caused by the feedback of CSI information may be reduced.

In a possible embodiment, each beam in the orthogonal beam group corresponds to an adjustment factor.

In the above method, when each beam in the orthogonal beam group corresponds to one adjustment factor, the adjustment factors of different beams are determined independently. If the channel conditions experienced by different beams are different, this embodiment may match the communication characteristics of the channels more flexibly.

In a possible embodiment, each of the specified coefficients is a linear combination coefficient in the first polarization direction, and a corresponding adjustment factor is used to determine a linear combination coefficient in the second polarization direction according to the linear combination coefficient in the first polarization direction.

In the above method, for the same beam, the linear combination coefficient in the first polarization direction differs from the linear combination coefficient in the second polarization direction by only one adjustment factor, so that the read and write operations may also be carried out orderly when generating the linear combination coefficient set in the precoding matrix information.

In a possible embodiment, adjustment factors of different layers satisfy a relationship, and the relationship makes the different layers have orthogonality.

In the above method, if the adjustment factors of different layers still have an association relationship, the different layers may satisfy the orthogonality to ensure the communication performance of the system. In addition, the adjustment factor only needs to be reported once, and the feedback overhead may be reduced with the increase in the quantity of layers.

In a possible embodiment, the method includes: configuring the relationship and sending the relationship to the terminal; or determining the relationship according to system predefinition.

In a possible embodiment, the relationship is an opposite relationship in terms of values.

In the above method, this relationship may realize the orthogonality among different layers in a simple manner.

In a possible embodiment, the method includes: receiving basis vector group information sent by the terminal; and precoding the communication signal according to the linear combination coefficient set, includes: determining complete precoding matrix information according to the linear combination coefficient set and the basis vector group information.

In a possible embodiment, each of the adjustment factors includes at least one of: an amplitude adjustment item or a phase adjustment item; where the amplitude adjustment item is used to adjust the amplitude coefficient, and the phase adjustment item is used to adjust the phase coefficient.

In the above method, the adjustment of the linear combination coefficients may be implemented as the separate adjustment of the amplitude coefficient, the separate adjustment of the phase coefficient, or the simultaneous adjustment of the amplitude coefficient and the phase coefficient. It may be seen that the adjustment method of the adjustment factors may be flexibly configured due to different adjustment objects and may cope with different scene requirements.

In a possible embodiment, adjustment factors of beams of which communication channel correlation is higher than a first value in the orthogonal beam group are identical; and/or adjustment factors of beams of which communication channel correlation is lower than a second value in the orthogonal beam group are different, where the first value is higher than the second value.

In the above method, the adjustment factors of different beams may be identical; and when the CSI information is fed back, the quantity of adjustment factors may be reduced, to lower the feedback overhead.

In a third aspect, the present application provides a terminal, the terminal including: a first determining device configured to determine an orthogonal beam group and precoding matrix information according to codebook parameter information; where a same beam in the orthogonal beam group has same specified coefficients in first and second polarization directions, each of the specified coefficients includes an amplitude coefficient and/or a phase coefficient, the precoding matrix information includes the specified coefficients and adjustment factors, the adjustment factors are used together with the specified coefficients to determine linear combination coefficients except the specified coefficients in a linear combination coefficient set; where the specified coefficients are a part of coefficients in the linear combination coefficient set; a first sending device configured to send the precoding matrix information to a network-side device.

In a fourth aspect, an embodiment of the present application provides a network-side device, the device including: a second sending device configured to send codebook parameter information to a terminal; a receiving device configured to receive precoding matrix information sent by the terminal, where the precoding matrix information includes specified coefficients and adjustment factors, where a same beam in the orthogonal beam group has same specified coefficients in first and second polarization directions, each of the specified coefficients includes an amplitude coefficient and/or a phase coefficient, and the specified coefficients are a part of coefficients in a linear combination coefficient set; a second determining device configured to determine linear combination coefficients except the specified coefficients in the linear combination coefficient set jointly according to the adjustment factors and the specified coefficients, to obtain the linear combination coefficient set; a precoding device configured to precode a communication signal according to the linear combination coefficient set.

In a fifth aspect, a communication device is provided, the communication device including: a processor, a memory and a transceiver; where the processor is configured to read computer instructions in the memory to execute the method described in any embodiment of the first aspect described above.

In a sixth aspect, a communication device is provided, the communication device including: a processor, a memory and a transceiver; where the processor is configured to read computer instructions in the memory to execute the method described in any embodiment of the second aspect described above.

In a seventh aspect, a computer readable storage medium is provided, where the computer readable storage medium stores computer executable instructions configured to cause a computer to perform the method described in any embodiment of the first aspect described above.

In an eighth aspect, a computer readable storage medium is provided, where the computer readable storage medium stores computer executable instructions configured to cause a computer to perform the method described in any embodiment of the second aspect described above.

BRIEF DESCRIPTION OF THE DRAWINGS

FIG. 4 is a flowchart of a channel state information feedback method on the terminal side in an embodiment of the present application;

FIG. 5 is a flowchart of a channel state information feedback method on the network-side device side in an embodiment of the present application;

DETAILED DESCRIPTION

Figure 1:
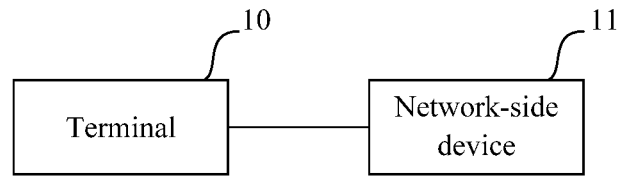
FIG. 1 is a schematic diagram of a system for channel state information feedback provided by an embodiment of the present application.

The Type II codebook is defined in the NR (New Radio) system. The Type II codebook in the Rel-15 system is based on the linear combination of orthogonal beams and has the higher channel quantization accuracy, but the feedback overhead is relatively large. In the Rel-16 system, a low-overhead Type II codebook is proposed, which is based on the linear combination of orthogonal beams and the compression of sub-band coefficients to reduce the CSI feedback overhead.

In order to reduce the feedback overhead of the CSI, embodiments of the present application provide a CSI feedback method and device, which reduce the feedback overhead of the CSI by quantizing the amplitude coefficients and phase coefficients that need to be fed back. Embodiments of the present application are applicable to the Rel-16 system, and perform the CSI feedback based on the Type II codebook structure.

Embodiments of the present application will be firstly illustrated below.

Linear combination coefficient set, as described in the background part, includes amplitude coefficients and phase coefficients, and the amplitude coefficients may include differential amplitude coefficients and/or reference amplitude coefficients.

Specified coefficients: a part of coefficients in the linear combination coefficient set, for example, the coefficients (including amplitude coefficient and/or phase coefficient) in the first polarization direction, or the coefficients in the second polarization direction.

"Terminal" in embodiments of the present application is also called User Equipment (UE), Mobile Station (MS), Mobile Terminal (MT), etc., and is a device for providing the voice and/or data connectivity to the user, e.g., a handheld device with the wireless connection function, a vehicle-carried device, etc. At present, some examples of the terminal are: mobile phone, tablet, laptop, palmtop computer, Mobile Internet Device (MID), wearable device, Virtual Reality (VR) device, Augmented Reality (AR) equipment, wireless terminal in the industrial control, wireless terminal in the self driving, wireless terminal in the remote medical surgery, wireless terminal in the smart grid, wireless terminal in the transportation safety, wireless terminal in the smart city, and wireless terminal in the smart home, etc.

"Network device" in embodiments of the present application may be an RAN node or a base station. The RAN is a part in the network that connects the terminal to the wireless network. The RAN node (or device) is a node (or device) in the radio access network, and may also be called the base station. At present, some examples of the RAN node are: gNB, Communication Reception Point (TRP), evolved Node B (eNB), Radio Network Controller (RNC), Node B (NB), Base Station Controller (BSC), Base Transceiver Station (BTS), home base station (for example, home evolved NodeB or Home Node B (HNB)), Base Band Unit (BBU), or Wireless Fidelity (Wife) Access Point (AP), etc. Furthermore, in a network structure, the RAN may include a Centralized Unit (CU) node and a Distributed Unit (DU) node.

"Codebook" in embodiments of the present application is a matrix, for example, the codebook is a precoding matrix.

"Beam" in embodiments of the present application is a vector, which may be called a beam vector or named in other ways.

Embodiments of the disclosure will be illustrated below in details with reference to the accompanying drawings. The described embodiments are a part of embodiments of the disclosure but not all embodiments.

When precoding the communication signal, the network-side device needs to configure the codebook parameter information for the terminal at first. The codebook parameter information includes, for example, the quantity of CSI-RS (Channel State Information Reference Signal) ports, and may also include the quantity of orthogonal beams in an orthogonal beam group. After receiving the codebook parameter information, the terminal needs to determine the orthogonal beam group and linear combination coefficient set as in the aforementioned formula (3), and reports the linear combination coefficient set to the network-side device. Then the network-side device precodes the communication signal according to the linear combination coefficient set. However, in this scenario, the linear combination coefficient set of each layer is determined separately, and the linear combination coefficient sets of two polarization directions of each beam are also determined independently, resulting in a sharp increase in the quantity of reported coefficients with the increase in the quantity of beams and the increase in the quantity of layers, so that the amount of information received by the terminal and the network-side device are continuously increased during feedback of the CSI information, increasing the processing burden of the terminal and the network-side device.

In view of the foregoing scenario, embodiments of the present application provide a solution to reduce the amount of CSI information feedback. In this solution, the terminal may control the repetition of some linear combination coefficients when determining the linear combination coefficient set, so that the repeated information only needs to be reported once during reporting without repeated report, achieving the purpose of saving the feedback overhead. At the same time, the orthogonality among layers may be realized by constraining the adjustment factors of different communication layers to satisfy a certain relationship, avoiding the inter-layer interference during multi-layer data communication. Referring to FIG. 1, which is a schematic diagram of a system for channel state information feedback provided by an embodiment of the present application, the system includes following parts.

A terminal 10, which determines an orthogonal beam group and the precoding matrix information according to the codebook parameter information; here, a same beam in the orthogonal beam group has same specified coefficients in first and second polarization directions, each of the specified coefficients includes an amplitude coefficient and/or a phase coefficient, the precoding matrix information includes the specified coefficients and adjustment factors, the adjustment factors are used together with the specified coefficients to determine linear combination coefficients except the specified coefficients in a linear combination coefficient set; and then sends the precoding matrix information to a network-side device.

The network-side device 11, which receives the precoding matrix information sent by the terminal after sending the codebook parameter information to the terminal, here, the precoding matrix information includes specified coefficients and adjustment factors; then determines linear combination coefficients except the specified coefficients in the linear combination coefficient set jointly according to the adjustment factors and the specified coefficients, to obtain the linear combination coefficient set; and precodes a communication signal according to the linear combination coefficient set based on the linear combination coefficient set.

Through this system, the terminal reports the specified coefficients in the linear combination coefficient set (that is, partial linear combination coefficients) rather than the entire linear combination coefficient set. In addition, the terminal reports the adjustment factors so that the network-side device may restore all required linear combination coefficients according to the adjustment factors. Since the quantity of reported coefficients is reduced, the system overhead caused by the feedback of CSI information may be reduced.

The reduction in system overhead will be illustrated below by way of example. Taking the layer 1 as an example, if the quantity of beams is L and the quantity of basis vectors is M, the linear combination coefficient set may include 2L*M*2=4LM coefficients according to the related art. After this solution is used, if the linear combination coefficients of each beam in the first polarization direction and the second polarization direction are the same, each beam needs to report M amplitude coefficients and M phase coefficients. If each beam in the orthogonal beam group corresponds to one adjustment factor, the layer 1 needs to report 2LM coefficients and L adjustment factors in total, so the feedback overhead may be reduced to nearly 50% of the original.

Further, if the adjustment factors of different layers still have an association relationship to satisfy the orthogonality among layers, then the adjustment factors need to be reported only once. Taking two layers as an example, the quantity of coefficients that need to be reported originally is 4LM*2=8LM, and the quantity of coefficients that need to be reported is 4LM+L after this solution is used. Therefore, the feedback overhead will be reduced with the increase in the quantity of layers.

In order to facilitate the understanding of the embodiments of the present application, this will be illustrated below.

In an embodiment, as described above, each beam may correspond to one adjustment factor; and when each beam in the orthogonal beam group corresponds to one adjustment factor, the adjustment factors of different beams are determined independently. If the channel conditions experienced by different beams are different, this embodiment may match the communication characteristics of the channels more flexibly.

Moreover, it should be noted that the adjustment factors in the orthogonal beam group may also be comprehensively determined in combination with the characteristics of different beams in addition to the embodiment in which the adjustment factor of each beam is independently determined. That is, some beams use the same adjustment factor. For example, the adjustment factors may be determined based on the correlation of the beams. That may be implemented as: adjustment factors of beams of which the communication channel correlation is higher than a first value in the orthogonal beam group are identical; and/or adjustment factors of beams of which the communication channel correlation is lower than a second value in the orthogonal beam group are different, here the first value is higher than the second value. For example, the first beam and the second beam in the orthogonal beam group use the same adjustment factor, and the remaining beams use another adjustment factor. In this case, the channel characteristics experienced by the first beam and the second beam are similar (with the strong correlation), while the channel characteristics experienced by the remaining beams are similar (with the strong correlation). In this embodiment, the adjustment factors of different beams may be identical; and when the CSI information is fed back, the quantity of adjustment factors may be reduced, to lower the feedback overhead.

As mentioned above, in order to facilitate the unified and convenient determination of linear combination coefficients by the terminal and the network-side device, each of the specified coefficients is a linear combination coefficient in the first polarization direction, and the corresponding adjustment factor is used to determine a linear combination coefficient in the second polarization direction according to the linear combination coefficient in the first polarization direction. Through this embodiment, for the same beam, the linear combination coefficient in the first polarization direction differs from the linear combination coefficient in the second polarization direction by only one adjustment factor. In a specific implementation, the single linear combination coefficient of the second polarization direction may be determined according to the adjustment factor, so that the read and write operations may also be carried out orderly when generating the linear combination coefficient set in the precoding matrix information.

In an embodiment, since the linear combination coefficient set generally includes amplitude coefficients and phase coefficients, each of the adjustment factors in an implementation may include at least one of: an amplitude adjustment item or a phase adjustment item; here the amplitude adjustment item is used to adjust the amplitude coefficient, and the phase adjustment item is used to adjust the phase coefficient. The adjustment factor may be as shown in formula (4):

$$\alpha_i = A_i \cdot e^{j\varphi_i} \quad (4)$$

In formula (4), $\alpha_i$ represents the adjustment factor, $A_i$ represents the amplitude adjustment item, and $e^{j\varphi_i}$ represents the phase adjustment item, here $\varphi_i$ may be obtained by non-uniformly quantizing the value interval $(0, 2\pi)$, or may be obtained by uniformly quantizing the value interval $(0, 2\pi)$, as shown in formula (5):

$$\phi_i \in \left\{ \frac{2\pi \cdot n}{T}, n = 0, 1 \cdots, T-1 \right\} \quad (5)$$

In formula (5), T is an integer greater than or equal to 1.

Of course, it should be noted that other value rules may also be configured according to the actual configuration, which are all applicable to embodiments of the present application, and this is not limited in the present application.

Through this embodiment, the adjustment of the linear combination coefficients may be implemented as the separate adjustment of the amplitude coefficient, the separate adjustment of the phase coefficient, or the simultaneous adjustment of the amplitude coefficient and the phase coefficient. It may be seen that the adjustment method of the adjustment factors may be flexibly configured due to different adjustment objects and may cope with different scene requirements. For example, if the channel characteristics among different polarizations have only one phase rotation, only the phase adjustment factor may be used.

The inventor found through research that the linear combination coefficient sets of different layers are determined independently in the related art, so that the orthogonality among different layers cannot be guaranteed, and thus the interference among data layers may occur during data communication, affecting the communication performance. This influence becomes increasingly prominent as the quantity of layers increases. In an embodiment of the present application, the adjustment factors of different layers satisfy a relationship, and the relationship makes the different layers have orthogonality. Through the relationship provided by an embodiment of the present application, the orthogonality may be satisfied among different layers to ensure the communication performance of the system. Furthermore, the relationship is only the relationship among adjustment factors of different layers, and the amount of data involved in the relationship is small and is also convenient to design and implement according to actual scene requirements.

In an embodiment, the relationship is an opposite relationship in terms of values. If the adjustment factor of the layer 1 is a, the corresponding adjustment factor of the layer 2 may be −a. This adjustment relationship may realize the orthogonality among different layers in a simple manner. For example, if there are two layers, the adjustment factors of beams with the same subscript in the layers 1 and 2 are opposite to each other. If there is a plurality of layers, such as three layers, the adjustment factors of beams with the same subscript in the layer 1 and layer 2 are opposite to each other, while only a part of the adjustment factors in the layer 2 and layer 3 are opposite to each other. For example, the adjustment factors in the first polarization direction in the layer 2 and layer 3 may be opposite to each other. When there are four layers, the configuration of the first three layers is the same as that of the aforementioned three layers, and the adjustment factor of the second polarization direction in the layer 4 and the adjustment factor of the layer 2 are opposite to each other. In a specific implementation, the adjustment factors may be set according to the required number of layers as long as the orthogonality among different layers can be satisfied, which is not limited in embodiments of the present application.

In an embodiment, the above-mentioned relationship may be configured by the network-side device and then sent to the terminal, or may be predefined by the system, that is, determined by the network-side device and the terminal through negotiation.

Further, if the basis vector group information is required during precoding, the codebook parameter information sent by the network-side device may include the quantity of basis vectors in the compressed basis vector group of each layer in an embodiment of the present application. Correspondingly, the terminal determines the basis vector group information of each layer according to the codebook parameter information, and sends the basis vector group information of each layer to the network-side device. Furthermore, after receiving the basis vector group information sent by the terminal, the network-side device determines the linear combination coefficients except the specified coefficients in the linear combination coefficient set jointly according to the adjustment factors and the specified coefficients, and determines the complete precoding matrix information in combination with the basis vector group information.

After the solution on the system side of embodiments of the present application is introduced, in order to facilitate the understanding of the solution provided by embodiments of the present application, examples will be given below.

First embodiment is as follows.

The base station configures the precoding matrix to use 2 L beams, and uses M basis vectors to form a compressed basis vector set. For the Type II codebook with Rank=1, the precoding may be expressed as shown in formula (6):

$$W = W_1 \tilde{W}_2 W_f^H = \begin{bmatrix} B_0 & B_1 & \cdots & B_{L-1} & & & & 0 \\ & & 0 & & B_0 & B_1 & \cdots & B_{L-1} \end{bmatrix}.$$  (6)

$$\begin{bmatrix} p_{diff}(0,0)q(0,0) & p_{diff}(0,1)q(0,1) & \cdots & p_{diff}(0,M-1)q(0,M-1) \\ \vdots & & & \\ p_{diff}(L-1,0)q(L-1,0) & p_{diff}(L-1,1)q(L-1,1) & \cdots & p_{diff}(L-1,M-1)q(L-1,M-1) \\ \alpha_0 p_{diff}(0,0)q(0,0) & \alpha_0 p_{diff}(0,1)q(0,1) & \cdots & \alpha_0 p_{diff}(0,M-1)q(0,M-1) \\ \vdots & & & \\ \alpha_{L-1} p_{diff}(2L-1,0)q(L-1,0) & \alpha_{L-1} p_{diff}(L-1,1)q(L-1,1) & \cdots & \alpha_{L-1} p_{diff}(L-1,M-1)q(L-1,M-1) \end{bmatrix}.$$

$$\begin{bmatrix} c_{0,0} & c_{0,1} & \cdots & c_{0,N_3-1} \\ c_{1,0} & c_{1,1} & \cdots & c_{1,N_3-1} \\ \vdots & & & \vdots \\ c_{M-1,0} & c_{M-1,1} & \cdots & c_{M-1,N_3-1} \end{bmatrix}$$

In formula (6), $W_1$ includes an orthogonal beam group of L orthogonal combined beams. $\tilde{W}_2$ represents the linear combination coefficient set, $p_{diff}(i,j)$ in $\tilde{W}_2$ represents a differential amplitude coefficient, $q(i,j)$ represents a phase coefficient, and $\alpha_i$ represents an adjustment factor. The coefficients of two polarization directions in $\tilde{W}_2$ corresponding to the beam $B_i$ are the $i+1^{th}$ row, $[p_{diff}(i,0)q(i,0) \; p_{diff}(i,1)q(i,1) \ldots p_{diff}(i, M-1)q(i, M-1)]$, and the $i+L+1^{th}$ row, $[\alpha_i p_{diff}(i,0)q(i,0) \; \alpha_i p_{diff}(i,1)q(i,1) \ldots \alpha_i p_{diff}(i, M-1)q(i, M-1)]$, respectively. In this embodiment, different polarization directions corresponding to the same beam use identical differential amplitude coefficients and identical phase coefficients, and the difference between two polarization directions is adjusted using an adjustment factor $\alpha_i$. The adjustment factor here may include an amplitude adjustment item and a phase adjustment item, or may include only an amplitude adjustment item or only a phase adjustment item. The adjustment factors corresponding to different beams may be determined independently, and may be identical or different. The value of the phase part in an adjustment factor may be $$\phi_i \in \left\{ \frac{2\pi \cdot n}{T}, n = 0, 1 \cdots, T-1 \right\},$$

here T is an integer greater than or equal to 1. During the CSI feedback, the terminal needs to report the adjustment factor corresponding to each beam to the base station.

Second embodiment is as follows.

The base station configures the precoding matrix to use 2 L beams, and uses M basis vectors to form a compressed basis vector group. For the Type II codebook with Rank=2, the precoding is expressed as shown in formula (7) and formula (8).

The precoding of the first layer is expressed as:

$$W^{(0)} = W_1 \tilde{W}_{2,0} W_{f,0}^H = \begin{bmatrix} B_0 & B_1 & \cdots & B_{L-1} & & & & 0 \\ & & 0 & & B_0 & B_1 & \cdots & B_{L-1} \end{bmatrix}. \tag{7}$$

$$\begin{bmatrix} p_{diff}^{(0)}(0,0)q^{(0)}(0,0) & p_{diff}^{(0)}(0,1)q^{(0)}(0,1) & \cdots & p_{diff}^{(0)}(0, M-1)q^{(0)}(0, M-1) \\ \vdots & & & \\ p_{diff}^{(0)}(L-1,0)q^{(0)}(L-1,0) & p_{diff}^{(0)}(L-1,1)q^{(0)}(L-1,1) & \cdots & p_{diff}^{(0)}(L-1, M-1)q^{(0)}(L-1, M-1) \\ \alpha_0^{(0)} p_{diff}^{(0)}(0,0)q^{(0)}(0,0) & \alpha_0^{(0)} p_{diff}^{(0)}(0,1)q^{(0)}(0,1) & \cdots & \alpha_0^{(0)} p_{diff}^{(0)}(0, M-1)q^{(0)}(0, M-1) \\ \vdots & & & \\ \alpha_{L-1}^{(0)} p_{diff}^{(0)}(L-1,0)q^{(0)}(L-1,0) & \alpha_{L-1}^{(0)} p_{diff}^{(0)}(L-1,1)q^{(0)}(L-1,1) & \cdots & \alpha_{L-1}^{(0)} p_{diff}^{(0)}(L-1, M-1)q^{(0)}(L-1, M-1) \end{bmatrix}$$

$$\begin{bmatrix} c_{0,0}^{(0)} & c_{0,1}^{(0)} & \cdots & c_{0,N_3-1}^{(0)} \\ c_{1,0}^{(0)} & c_{1,1}^{(0)} & \cdots & c_{1,N_3-1}^{(0)} \\ \vdots & & & \vdots \\ c_{M-1,0}^{(0)} & c_{M-1,1}^{(0)} & \cdots & c_{M-1,N_3-1}^{(0)} \end{bmatrix}$$

The precoding of the second layer is expressed as shown in formula (8):

$$W^{(1)} = W_1 \tilde{W}_{2,1} W_{f,1}^H = \begin{bmatrix} B_0 & B_1 & \cdots & B_{L-1} & & & & 0 \\ & & 0 & & B_0 & B_1 & \cdots & B_{L-1} \end{bmatrix}. \tag{8}$$

$$\begin{bmatrix} p_{diff}^{(1)}(0,0)q^{(1)}(0,0) & p_{diff}^{(1)}(0,1)q^{(1)}(0,1) & \cdots & p_{diff}^{(1)}(0, M-1)q^{(1)}(0, M-1) \\ \vdots & & & \\ p_{diff}^{(1)}(L-1,0)q^{(1)}(L-1,0) & p_{diff}^{(1)}(L-1,1)q^{(1)}(L-1,1) & \cdots & p_{diff}^{(1)}(L-1, M-1)q^{(1)}(L-1, M-1) \\ \alpha_0^{(1)} p_{diff}^{(1)}(0,0)q^{(1)}(0,0) & \alpha_0^{(1)} p_{diff}^{(1)}(0,1)q^{(1)}(0,1) & \cdots & \alpha_0^{(1)} p_{diff}^{(1)}(0, M-1)q^{(1)}(0, M-1) \\ \vdots & & & \\ \alpha_{L-1}^{(1)} p_{diff}^{(1)}(L-1,0)q^{(1)}(L-1,0) & \alpha_{L-1}^{(1)} p_{diff}^{(1)}(L-1,1)q^{(1)}(L-1,1) & \cdots & \alpha_{L-1}^{(1)} p_{diff}^{(1)}(L-1, M-1)q^{(1)}(L-1, M-1) \end{bmatrix}$$

$$\begin{bmatrix} c_{0,0}^{(0)} & c_{0,1}^{(0)} & \cdots & c_{0,N_3-1}^{(0)} \\ c_{1,0}^{(0)} & c_{1,1}^{(0)} & \cdots & c_{1,N_3-1}^{(0)} \\ \vdots & & & \vdots \\ c_{M-1,0}^{(0)} & c_{M-1,1}^{(0)} & \cdots & c_{M-1,N_3-1}^{(0)} \end{bmatrix}$$

Here, $W_1$ contains L orthogonal combined beams, and each layer is the same. $\tilde{W}_{2,l}$ represents the linear combination coefficient set of the layer 1, $p_{diff}^{(l)}(i,j)$ represents the differential amplitude coefficient of the layer 1, $q^{(1)}(i,j)$ represents the phase coefficient of the layer 1, and $\alpha_i^{(l)}$ represents the adjustment factor of the layer 1. Similar to the first embodiment, for the same layer, different polarization directions corresponding to the same beam use identical differential amplitude coefficients and identical phase coefficients, and the difference between two polarization directions is adjusted using an adjustment factor $\alpha_i^{(l)}$. The adjustment factor here may include an amplitude adjustment item and a phase adjustment item, i.e., $\alpha_i^{(l)} = A_i^{(l)} \cdot e^{j\varphi_i^{(l)}}$, or may include only an amplitude adjustment item or only a phase adjustment item. Further, the orthogonality among layers may be realized by constraining the relationship among adjustment factors of different layers. A constraint relationship is as shown in formula (9):

$$\alpha_i^{(1)} = -\alpha_i^{(0)}, i=0,1,\ldots,L-1 \text{ and } A_i^{(l)}=1 \tag{9}$$

The value of the phase part in an adjustment factor may be $$\phi_i \in \left\{ \frac{2\pi \cdot n}{T}, n = 0, 1 \cdots, T-1 \right\},$$

here T is an integer greater than or equal to 1. The amplitude characteristics of the channels experienced by the same beam in two polarization directions are identical, so the amplitude in the adjustment factor is fixed at 1. In this embodiment, not only the feedback overhead of the linear combination coefficient set is reduced, but also the orthogonality among layers is ensured. During the CSI feedback, the terminal needs to report the adjustment factor corresponding to each beam to the base station. Since the adjustment factor relationship between two layers is fixed, the adjustment factor of only one layer may be fed back.

Figure 2:
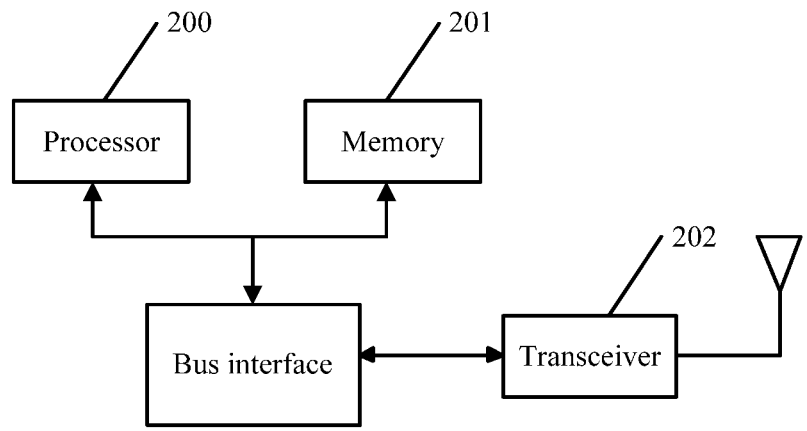
FIG. 2 is a communication device provided by an embodiment of the present application.

Based on the same inventive concept, embodiments of the present application provide a terminal and a network-side device. Referring to FIG. 2, another communication device provided by an embodiment of the present application includes: at least one processor 200, at least one memory 201, and at least one transceiver 202, here the transceiver 202 receives and sends information under the control of the processor 200. The memory 201 stores program codes, and the program codes, when executed by the processor 200, cause the processor 200 to perform the following process.

In one embodiment, the processor 200 is configured to perform: determining an orthogonal beam group and the precoding matrix information according to the codebook parameter information; where a same beam in the orthogonal beam group has same specified coefficients in first and second polarization directions, each of the specified coefficients includes an amplitude coefficient and/or a phase coefficient, the precoding matrix information includes the specified coefficients and adjustment factors, the adjustment factors are used together with the specified coefficients to determine linear combination coefficients except the specified coefficients in a linear combination coefficient set; where the specified coefficients are a part of coefficients in the linear combination coefficient set; sending the precoding matrix information to a network-side device.

In one embodiment, each beam in the orthogonal beam group corresponds to an adjustment factor.

In one embodiment, adjustment factors of different beams in the orthogonal beam group are determined independently, or some beams in the orthogonal beam group use a same adjustment factor.

In one embodiment, each of the specified coefficients is a linear combination coefficient in the first polarization direction, and a corresponding adjustment factor is used to determine a linear combination coefficient in the second polarization direction according to the linear combination coefficient in the first polarization direction.

In one embodiment, adjustment factors of different layers satisfy a relationship, and the adjustment factors make the different layers have orthogonality.

In one embodiment, the relationship is configured by the network-side device or predefined by a system.

In one embodiment, the relationship is an opposite relationship in terms of values.

In one embodiment, the processor 200 is configured to perform: determining the basis vector group information of each layer according to the codebook parameter information, and sending the basis vector group information of each layer to the network-side device.

In one embodiment, each of the adjustment factors includes at least one of: an amplitude adjustment item or a phase adjustment item; where the amplitude adjustment item is used to adjust the amplitude coefficient, and the phase adjustment item is used to adjust the phase coefficient.

In one embodiment, adjustment factors of beams of which the communication channel correlation is higher than a first value in the orthogonal beam group are identical; and/or adjustment factors of beams of which the communication channel correlation is lower than a second value in the orthogonal beam group are different, where the first value is higher than the second value.

In one embodiment, the specified coefficients are non-zero coefficients.

Figure 3:
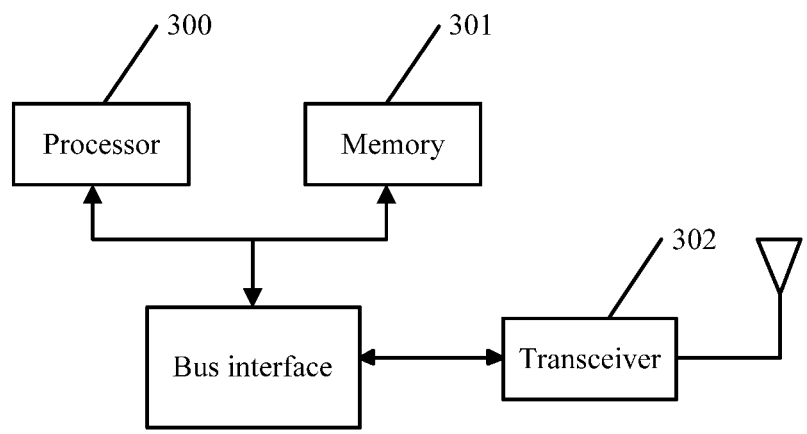
FIG. 3 is another communication device provided by an embodiment of the present application.

Referring to FIG. 3, another communication device provided by an embodiment of the present application is illustrated. The network-side device includes: at least one processor 300, at least one memory 301, and at least one transceiver 302, where the transceiver 302 receives and sends information under the control of the processor 300. The memory 301 stores program codes, and the program codes, when executed by the processor 300, cause the processor 300 to perform the following process.

Further, the processor 300 is configured to perform: sending codebook parameter information to a terminal; receiving precoding matrix information sent by the terminal, where the precoding matrix information includes specified coefficients and adjustment factors, where a same beam in an orthogonal beam group has same specified coefficients in first and second polarization directions, each of the specified coefficients includes an amplitude coefficient and/or a phase coefficient, and the specified coefficients are a part of coefficients in a linear combination coefficient set; determining linear combination coefficients except the specified coefficients in the linear combination coefficient set jointly according to the adjustment factors and the specified coefficients, to obtain the linear combination coefficient set; precoding a communication signal according to the linear combination coefficient set.

In one embodiment, each of the specified coefficients is a linear combination coefficient in the first polarization direction, and a corresponding adjustment factor is used to determine a linear combination coefficient in the second polarization direction according to the linear combination coefficient in the first polarization direction.

In one embodiment, adjustment factors of different layers satisfy a relationship, and the adjustment factors make the different layers have orthogonality.

In one embodiment, the processor 300 is configured to perform: configuring the relationship and sending the relationship to the terminal; or determining the relationship according to system predefinition.

In one embodiment, the relationship is an opposite relationship in terms of values.

In one embodiment, the processor 300 is configured to perform: receiving the basis vector group information sent by the terminal; and the process of precoding the communication signal according to the linear combination coefficient set includes: determining the linear combination coefficients except the specified coefficients in the linear combination coefficient set jointly according to the adjustment factors and the specified coefficients, and determining complete precoding matrix information in combination with the basis vector group information.

In one embodiment, each of the adjustment factors includes at least one of: an amplitude adjustment item or a phase adjustment item; where the amplitude adjustment item is used to adjust the amplitude coefficient, and the phase adjustment item is used to adjust the phase coefficient.

In one embodiment, adjustment factors of beams of which the communication channel correlation is higher than a first value in the orthogonal beam group are identical; and/or adjustment factors of beams of which the communication channel correlation is lower than a second value in the orthogonal beam group are different, where the first value is higher than the second value.

Based on the same inventive concept, an embodiment of the disclosure provides a channel state information feedback method. Since the system corresponding to this method is the network-side device and the terminal in embodiments of the present application and the principle of this method to solve the problem is similar to that of this system, the implementations of this method may refer to the implementations of the system, and the repeated description thereof will be omitted here.

Referring to FIG. 4, a flowchart of a channel state information feedback method on the terminal side in an embodiment of the present application is illustrated. The process includes the following steps.

Step 401: a terminal determines an orthogonal beam group and precoding matrix information according to codebook parameter information; where a same beam in the orthogonal beam group has same specified coefficients in first and second polarization directions, each of the specified coefficients includes an amplitude coefficient and/or a phase coefficient, the precoding matrix information includes the specified coefficients and adjustment factors, the adjustment factors are used together with the specified coefficients to determine linear combination coefficients except the specified coefficients in a linear combination coefficient set; where the specified coefficients are a part of coefficients in the linear combination coefficient set.

Step 402: sending the precoding matrix information to a network-side device.

Further, each beam in the orthogonal beam group corresponds to an adjustment factor.

Further, adjustment factors of different beams in the orthogonal beam group are determined independently, or some beams in the orthogonal beam group use a same adjustment factor.

Further, each of the specified coefficients is a linear combination coefficient in the first polarization direction, and a corresponding adjustment factor is used to determine a linear combination coefficient in the second polarization direction according to the linear combination coefficient in the first polarization direction.

Further, adjustment factors of different layers satisfy a relationship, and the adjustment factors make the different layers have orthogonality.

Further, the relationship is configured by the network-side device or predefined by a system.

Further, the relationship is an opposite relationship in terms of values.

Further, the method includes: determining basis vector group information of each layer according to the codebook parameter information, and sending the basis vector group information of each layer to the network-side device.

Further, each of the adjustment factors includes at least one of: an amplitude adjustment item or a phase adjustment item; where the amplitude adjustment item is used to adjust the amplitude coefficient, and the phase adjustment item is used to adjust the phase coefficient.

Further, adjustment factors of beams of which the communication channel correlation is higher than a first value in the orthogonal beam group are identical; and/or adjustment factors of beams of which the communication channel correlation is lower than a second value in the orthogonal beam group are different, where the first value is higher than the second value.

Further, the specified coefficients are non-zero coefficients.

Referring to FIG. 5, a flowchart of a channel state information feedback method on the network-side device side in an embodiment of the present application is illustrated. The process includes the following steps.

Step 501: a network-side device sends codebook parameter information to a terminal.

Step 502: receiving precoding matrix information sent by the terminal, where the precoding matrix information includes specified coefficients and adjustment factors, where a same beam in an orthogonal beam group has same specified coefficients in first and second polarization directions, each of the specified coefficients includes an amplitude coefficient and/or a phase coefficient, and the specified coefficients are a part of coefficients in a linear combination coefficient set.

Step 503: determining linear combination coefficients except the specified coefficients in the linear combination coefficient set jointly according to the adjustment factors and the specified coefficients, to obtain the linear combination coefficient set.

Step 504: precoding a communication signal according to the linear combination coefficient set.

Further, each beam in the orthogonal beam group corresponds to an adjustment factor.

Further, each of the specified coefficients is a linear combination coefficient in the first polarization direction, and a corresponding adjustment factor is used to determine a linear combination coefficient in the second polarization direction according to the linear combination coefficient in the first polarization direction.

Further, adjustment factors of different layers satisfy a relationship, and the adjustment factors make the different layers have orthogonality.

Further, the method includes: configuring the relationship and sending the relationship to the terminal; or determining the relationship according to system predefinition.

Further, the relationship is an opposite relationship in terms of values.

Further, the method includes: receiving basis vector group information sent by the terminal; and the step of precoding the communication signal according to the linear combination coefficient set includes: determining complete precoding matrix information according to the linear combination coefficient set and the basis vector group information.

Further, the relationship the adjustment factors includes at least one of: an amplitude adjustment item or a phase adjustment item; where the amplitude adjustment item is used to adjust the amplitude coefficient, and the phase adjustment item is used to adjust the phase coefficient.

Further, adjustment factors of beams of which the communication channel correlation is higher than a first value in the orthogonal beam group are identical; and/or adjustment factors of beams of which the communication channel correlation is lower than a second value in the orthogonal beam group are different, where the first value is higher than the second value.

Figure 6:
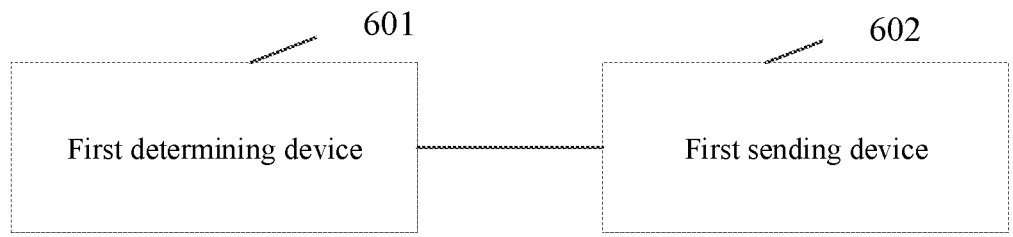
FIG. 6 is a schematic diagram of a terminal in an embodiment of the present application.

Referring to FIG. 6, a schematic diagram of a terminal in an embodiment of the present application is illustrated. The terminal includes: a first determining device 601 configured to determine an orthogonal beam group and precoding matrix information according to codebook parameter information; where a same beam in the orthogonal beam group has same specified coefficients in first and second polarization directions, each of the specified coefficients includes an amplitude coefficient and/or a phase coefficient, the precoding matrix information includes the specified coefficients and adjustment factors, the adjustment factors are used together with the specified coefficients to determine linear combination coefficients except the specified coefficients in a linear combination coefficient set; where the specified coefficients are a part of coefficients in the linear combination coefficient set; a first sending device 602 configured to send the precoding matrix information to a network-side device.

In one embodiment, each beam in the orthogonal beam group corresponds to an adjustment factor.

In one embodiment, adjustment factors of different beams in the orthogonal beam group are determined independently, or some beams in the orthogonal beam group use a same adjustment factor.

In one embodiment, each of the specified coefficients is a linear combination coefficient in the first polarization direction, and a corresponding the adjustment factor is used to determine a linear combination coefficient in the second polarization direction according to the linear combination coefficient in the first polarization direction.

In one embodiment, adjustment factors of different layers satisfy a relationship, and the adjustment factors make the different layers have orthogonality.

In one embodiment, the relationship is configured by the network-side device or predefined by a system.

In one embodiment, the relationship is an opposite relationship in terms of values.

In one embodiment, the first sending device is configured to: determine basis vector group information of each layer according to the codebook parameter information, and send the basis vector group information of each layer to the network-side device.

In one embodiment, each of the adjustment factors includes at least one of: an amplitude adjustment item or a phase adjustment item; where the amplitude adjustment item is used to adjust the amplitude coefficient, and the phase adjustment item is used to adjust the phase coefficient.

In one embodiment, adjustment factors of beams of which the communication channel correlation is higher than a first value in the orthogonal beam group are identical; and/or adjustment factors of beams of which the communication channel correlation is lower than a second value in the orthogonal beam group are different, where the first value is higher than the second value.

In one embodiment, the specified coefficients are non-zero coefficients.

Figure 7:
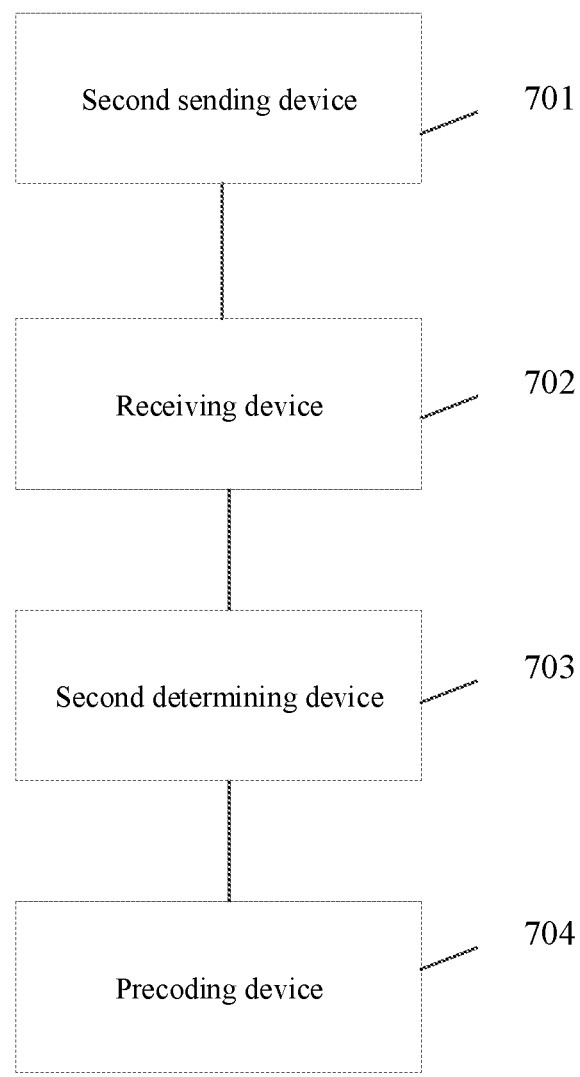
FIG. 7 is a schematic diagram of a network-side device in an embodiment of the present application.

Referring to FIG. 7, a schematic diagram of a network-side device in an embodiment of the present application is illustrated. The network-side device includes: a second sending device 701 configured to send codebook parameter information to a terminal; a receiving device 702 configured to receive precoding matrix information sent by the terminal, where the precoding matrix information includes specified coefficients and adjustment factors, where a same beam in an orthogonal beam group has same specified coefficients in first and second polarization directions, each of the specified coefficients includes an amplitude coefficient and/or a phase coefficient, and the specified coefficients are a part of coefficients in a linear combination coefficient set; a second determining device 703 configured to determine linear combination coefficients except the specified coefficients in the linear combination coefficient set jointly according to the adjustment factors and the specified coefficients, to obtain the linear combination coefficient set; a precoding device 704 configured to precode a communication signal according to the linear combination coefficient set.

In one embodiment, each beam in the orthogonal beam group corresponds to an adjustment factor.

In one embodiment, each of the specified coefficients is a linear combination coefficient in the first polarization direction, and a corresponding adjustment factor is used to determine a linear combination coefficient in the second polarization direction according to the linear combination coefficient in the first polarization direction.

In one embodiment, adjustment factors of different layers satisfy a relationship, and the adjustment factors make the different layers have orthogonality.

In one embodiment, the device is configured to: configure the relationship and send the relationship to the terminal; or determine the relationship according to the system predefinition.

In one embodiment, the relationship is an opposite relationship in terms of values.

In one embodiment, the receiving device is configured to: receive basis vector group information sent by the terminal; and the precoding device is configured to: determine the linear combination coefficients except the specified coefficients in the linear combination coefficient set jointly according to the adjustment factors and the specified coefficients, and determine complete precoding matrix information in combination with the basis vector group information.

In one embodiment, each of the adjustment factors includes at least one of: an amplitude adjustment item or a phase adjustment item; where the amplitude adjustment item is used to adjust the amplitude coefficient, and the phase adjustment item is used to adjust the phase coefficient.

In one embodiment, adjustment factors of beams of which the communication channel correlation is higher than a first value in the orthogonal beam group are identical; and/or adjustment factors of beams of which the communication channel correlation is lower than a second value in the orthogonal beam group are different, where the first value is higher than the second value.

An embodiment of the present disclosure provides a computer-readable non-transitory storage medium including program codes. When the program codes run on a computing device, the program codes are configured to cause the computing terminal to perform the steps of the channel state information feedback method of embodiments of the disclosure described above.

The present application has been described above by reference to the block diagrams and/or flow charts showing the methods, devices (systems) and/or computer program products according to embodiments of the present application. It should be understood that one block shown in the block diagrams and/or flow charts and a combination of the blocks shown in the block diagrams and/or flow charts may be implemented by the computer program instructions. These computer program instructions may be provided to a general-purpose computer, a processor of a dedicated computer and/or another programmable data processing unit to produce a machine, so that the instructions executed by the computer processor and/or another programmable data processing unit create the methods for implementing the functions and/or actions specified in the blocks of the block diagrams and/or flow charts.

Accordingly, the present application may also be implemented by the hardware and/or software (including the firmware, resident software, microcode and the like). Further, the present application may adopt the form of computer program products on the computer usable or computer readable storage medium, which has the computer usable or computer readable program codes implemented in the medium, to be used by the instruction execution system or used in combination with the instruction execution system. In the context of the present application, the computer usable or computer readable storage medium may be any medium, which may contain, store, communicate with, transmit or transfer the programs, to be used by the instruction execution system, apparatus or device, or used in combination with the instruction execution system, apparatus or device.

What is claimed is:

1. A channel state information feedback method, the method comprising:
   determining, by a terminal, an orthogonal beam group and precoding matrix information according to codebook parameter information; wherein a same beam in the orthogonal beam group has same specified coefficients in first and second polarization directions, each of the specified coefficients comprises an amplitude coefficient and/or a phase coefficient, the precoding matrix information comprises the specified coefficients and adjustment factors, the adjustment factors are used together with the specified coefficients to determine linear combination coefficients except the specified coefficients in a linear combination coefficient set; wherein the specified coefficients are a part of coefficients in the linear combination coefficient set;
   sending the precoding matrix information to a network-side device.

2. The method of claim 1, wherein each beam in the orthogonal beam group corresponds to an adjustment factor.

3. The method of claim 1, wherein adjustment factors of different beams in the orthogonal beam group are determined independently, or some beams in the orthogonal beam group use a same adjustment factor.

4. The method of claim 1, wherein each of the specified coefficients is a linear combination coefficient in the first polarization direction, and a corresponding adjustment factor is used to determine a linear combination coefficient in the second polarization direction according to the linear combination coefficient in the first polarization direction.

5. The method of claim 1, wherein adjustment factors of different layers satisfy a relationship, and the adjustment factors make the different layers have orthogonality;
   wherein the relationship is configured by the network-side device or predefined by a system.

6. The method of claim 5, wherein the relationship is an opposite relationship in terms of values.

7. The method of claim 1, wherein the method comprises:
   determining basis vector group information of each layer according to the codebook parameter information, and sending the basis vector group information of each layer to the network-side device.

8. The method of claim 1, wherein each of the adjustment factors comprises at least one of: an amplitude adjustment item or a phase adjustment item; wherein the amplitude adjustment item is used to adjust the amplitude coefficient, and the phase adjustment item is used to adjust the phase coefficient.

9. The method of claim 1, wherein adjustment factors of beams of which communication channel correlation is higher than a first value in the orthogonal beam group are identical; and/or
   adjustment factors of beams of which communication channel correlation is lower than a second value in the orthogonal beam group are different, wherein the first value is higher than the second value.

10. The method of claim 1, wherein the specified coefficients are non-zero coefficients.

11. A channel state information feedback method, the method comprising:
   sending, by a network-side device, codebook parameter information to a terminal;
   receiving precoding matrix information sent by the terminal, wherein the precoding matrix information comprises specified coefficients and adjustment factors, wherein a same beam in an orthogonal beam group has same specified coefficients in first and second polarization directions, each of the specified coefficients comprises an amplitude coefficient and/or a phase coefficient, and the specified coefficients are a part of coefficients in a linear combination coefficient set;
   determining linear combination coefficients except the specified coefficients in the linear combination coefficient set jointly according to the adjustment factors and the specified coefficients, to obtain the linear combination coefficient set;
   precoding a communication signal according to the linear combination coefficient set.

12. The method of claim 11, wherein each beam in the orthogonal beam group corresponds to an adjustment factor.

13. The method of claim 11, wherein each of the specified coefficients is a linear combination coefficient in the first polarization direction, and a corresponding adjustment factor is used to determine a linear combination coefficient in the second polarization direction according to the linear combination coefficient in the first polarization direction.

14. The method of claim 11, wherein adjustment factors of different layers satisfy a relationship, and the adjustment factors make the different layers have orthogonality;
   wherein the method comprises:
   configuring the relationship and sending the relationship to the terminal; or
   determining the relationship according to system predefinition.

15. The method of claim 14, wherein the relationship is an opposite relationship in terms of values.

16. The method of claim 11, wherein the method comprises:

receiving basis vector group information sent by the terminal;

precoding the communication signal according to the linear combination coefficient set, comprises:

determining complete precoding matrix information according to the linear combination coefficient set and the basis vector group information.

17. The method of claim 11, wherein each of the adjustment factors comprises at least one of: an amplitude adjustment item or a phase adjustment item; wherein the amplitude adjustment item is used to adjust the amplitude coefficient, and the phase adjustment item is used to adjust the phase coefficient.

18. The method of claim 11, wherein adjustment factors of beams of which communication channel correlation is higher than a first value in the orthogonal beam group are identical; and/or adjustment factors of beams of which communication channel correlation is lower than a second value in the orthogonal beam group are different, wherein the first value is higher than the second value.

19. A communication device, comprising: a processor, a memory and a transceiver; wherein the processor is configured to read computer instructions in the memory to perform:

determining an orthogonal beam group and precoding matrix information according to codebook parameter information; wherein a same beam in the orthogonal beam group has same specified coefficients in first and second polarization directions, each of the specified coefficients comprises an amplitude coefficient and/or a phase coefficient, the precoding matrix information comprises the specified coefficients and adjustment factors, the adjustment factors are used together with the specified coefficients to determine linear combination coefficients except the specified coefficients in a linear combination coefficient set; wherein the specified coefficients are a part of coefficients in the linear combination coefficient set;

sending the precoding matrix information to a network-side device.

20. A communication device, the communication device comprising: a processor, a memory and a transceiver;

wherein the processor is configured to read a program in the memory and perform the method of claim 11.

\* \* \* \* \*